Dec. 23, 1952     L. BERTELE     2,622,480
FOUR-COMPONENT OBJECTIVE COMPOSED OF SIX LENSES
Filed June 22, 1951
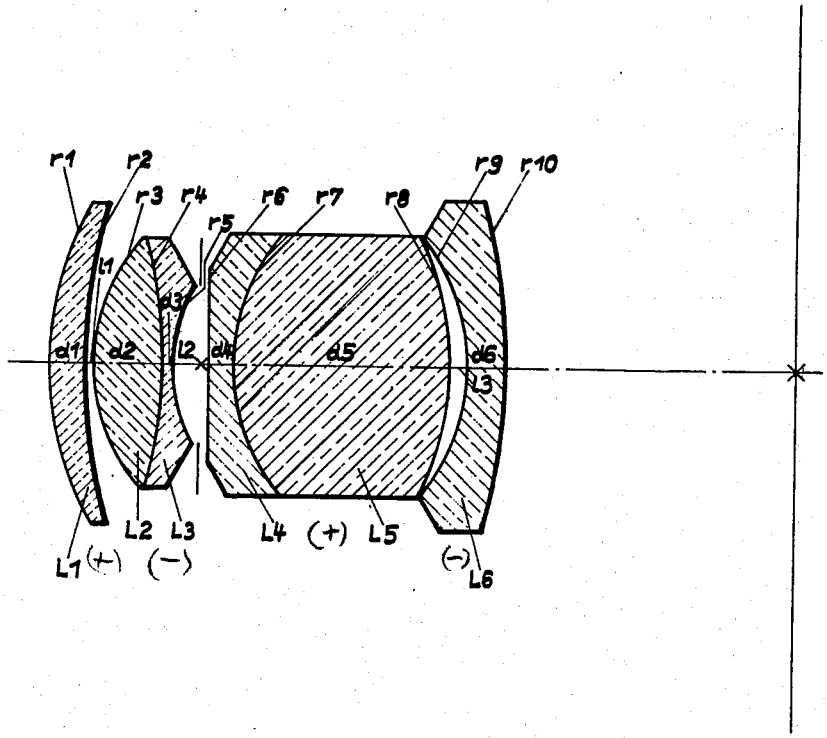
Inventor:
Ludwig Bertele Patented Dec. 23, 1952

2,622,480

UNITED STATES PATENT OFFICE 2,622,480

FOUR-COMPONENT OBJECTIVE COMPOSED OF SIX LENSES

Ludwig Bertele, Heerbrugg, Switzerland

Application June 22, 1951, Serial No. 232,965
In Switzerland June 24, 1950

5 Claims. (Cl. 88—57)

The present invention relates to an objective type with six single lenses composed such as to form four members separated by air spaces. The first member, i. e. the member facing the object is a single convergent lens deflected towards the object. The second member is a meniscus composed of a convergent and a divergent lens cemented together and being strongly deflected towards the object, both lenses including a cemented surface being deflected towards the image and having a diverging power. The third member has a collecting power and is composed of a divergent and a convergent lens cemented together, the cemented surfaces being deflected towards the object and having a strongly collecting power. The fourth member is a single divergent lens deflected towards the image. The air space between the first and the second member has the shape of a divergent lens deflected towards the object. The air space between the second and the third member has the shape of a convergent lens with its stronger curved surface directed towards the object, and the third air space has the shape of a convergent lens deflected towards the image.

With pencils of oblique rays, known objectives of the six lens type require a correction as regards junction in the sagittal intersection plane. The sagittal curve is unsatisfactory from about ±26° and ought to have a more straight reach. For obtaining this correction in the first place, influences hindering flattening of the image field in the meaning of Petzval's formula have to be eliminated. Too wide an over-all length of that lens-group following the iris diaphragm arranged within the second air space is of especially unfavorable influence. In well known six lens objectives this over-all length amounts to 0.688 of the focal length and therefore the last lens surface is lying considerably near to the image plane, viz. in a distance of 0.21 of the focal length. Though this lens surface must be convex with regard to correction of distortion and astigmatism, there merely arises a minute shortening of the total focal length in consequence to the small distance from the image plane as compared e. g. with the application of a plane outer lens surface. On the other hand the detrimental influence remains fully existent with regard to curvature of the image field and has to be compensated by suitable performance of the remaining lens members. This interrelation in the known six lens objectives results in an undesired reactive effect on the extra-axial image errors and especially on the character of the sagittal curve. With another construction, which has become known later on, one has succeeded upon applying a cemented surface with converging effect to the fourth member which surface is strongly deflected towards the image, in considerably reducing the over-all length of the lens group following the iris-diaphragm and therewith in enlarging the spacing between the final lens surface and the image plane. The insertion however of the cemented surface included within the fourth member obviously is counteracting to an improvement of the sagittal curve, as in spite of the greater expenditure by an application of seven single lenses this procedure did not result in a full success.

For perfecting the six lens objective type described at the beginning the third and the fourth member according to the invention in total consist merely of three lenses and the over-all length of both these members is in total greater than 0.3 and smaller than 0.66 of the focal length.

For reaching the aim pursued with the invention the following features are of advantage which may be applied separately or in common.

The sum of the refractive indices for the $d$-line of the lens constituting the first member and of the convergent lens of the second member is greater than 3.295. In this case it is of advantage to choose the total of the refractive indices as great as possible, the upper limit for this reason is given by the glass species available.

The axial thickness of the second member is smaller than 0.134 of the focal length.

In the third member the refractive index of the convergent lens is greater than 1.63 and the radius of the surface directed towards the fourth member is smaller than 0.59 of the focal length.

The quotient of the radii of the surfaces defining the third air lens is smaller than 1.8 and greater than 1.2, the thickness of this lens amounting to between 0.020 and 0.050 of the focal length.

In the drawing an example of an objective according to the invention is represented. The data of three examples of objectives corresponding to the invention are given. The data are relative to a focal length of 100 units, and the objectives are calculated with an aperture ratio of 1:2.8 and with an image field of ±31°.

*Example 1*

|   |   |   | $n_d$ | V |
|---|---|---|---|---|
| $L_1$ | $r_1 = +54.88$ | $d_1 = 5.99$ | 1.6910 | 54.8 |
|  | $r_2 = +103.46$ | $l_1 = 0.57$ |  |  |
| $L_2$ | $r_3 = +30.46$ | $d_2 = 11.12$ | 1.6645 | 35.8 |
|  | $r_4 = -94.08$ |  |  |  |
| $L_3$ | $r_5 = +25.18$ | $d_3 = 1.71$ | 1.7387 | 28.3 |
|  |  | $l_2 = 6.13$ |  |  |
| $L_4$ | $r_6 = \infty$ | $d_4 = 4.28$ | 1.5014 | 56.5 |
| $L_5$ | $r_7 = +33.50$ | $d_5 = 34.93$ | 1.6910 | 54.8 |
|  | $r_8 = -57.20$ | $l_3 = 3.14$ |  |  |
| $L_6$ | $r_9 = -36.07$ | $d_6 = 6.42$ | 1.5163 | 60.6 |
|  | $r_{10} = -114.25$ |  |  |  |

*Example 2*

|   |   |   | $n_d$ | V |
|---|---|---|---|---|
| $L_1$ | $r_1 = +56.60$ | $d_1 = 5.90$ | 1.6420 | 58.0 |
|  | $r_2 = +122.80$ | $l_1 = 0.56$ |  |  |
| $L_2$ | $r_3 = +29.70$ | $d_2 = 10.95$ | 1.6645 | 35.8 |
|  | $r_4 = -100.18$ |  |  |  |
| $L_3$ | $r_5 = +24.45$ | $d_3 = 1.69$ | 1.7387 | 28.3 |
|  |  | $l_2 = 6.04$ |  |  |
| $L_4$ | $r_6 = -466.9$ | $d_4 = 4.21$ | 1.5014 | 56.5 |
| $L_5$ | $r_7 = +33.71$ | $d_5 = 30.90$ | 1.6910 | 54.8 |
|  | $r_8 = -53.25$ | $l_3 = 3.09$ |  |  |
| $L_6$ | $r_9 = -36.09$ | $d_6 = 8.43$ | 1.5163 | 64.0 |
|  | $r_{10} = -107.0$ |  |  |  |

*Example 3*

|   |   |   | $n_d$ | V |
|---|---|---|---|---|
| $L_1$ | $r_1 = +57.66$ | $d_1 = 5.91$ | 1.6910 | 54.8 |
|  | $r_2 = +116.72$ | $l_1 = 0.56$ |  |  |
| $L_2$ | $r_3 = +30.05$ | $d_2 = 10.97$ | 1.6645 | 35.8 |
|  | $r_4 = -98.44$ |  |  |  |
| $L_3$ | $r_5 = +24.80$ | $d_3 = 1.69$ | 1.7387 | 28.3 |
|  |  | $l_2 = 6.05$ |  |  |
| $L_4$ | $r_6 = -421.9$ | $d_4 = 4.22$ | 1.5014 | 56.5 |
| $L_5$ | $r_7 = +33.05$ | $d_5 = 30.94$ | 1.6910 | 54.8 |
|  | $r_8 = -53.32$ | $l_3 = 3.09$ |  |  |
| $L_6$ | $r_9 = -35.58$ | $d_6 = 8.44$ | 1.5163 | 60.6 |
|  | $r_{10} = -102.07$ |  |  |  |

I claim:

1. Objective consisting of six lenses composed such as to form four members separated by air spaces, the first member of which being a single lens deflected towards the object, the second member being composed of a convergent and a divergent lens cemented together, the cemented surface being deflected towards the image and having a diverging power, the third member having a collecting power and being composed of a divergent and a convergent lens cemented together, the cemented surfaces being deflected towards the object and having a strongly collecting power, and the fourth member being a single divergent lens deflected towards the image, characterized in that the over-all length of the third and the fourth member is in total greater than 0.30 f and smaller than 0.66 f, wherein f is the focal length of the objective.

2. Objective according to claim 1, characterized in that the sum of the reciprocals of the radii of curvature of the front surfaces of the first two components diminished by the reciprocal of the radius of curvature of the rear surface of the front component is comprised within the range of 5.0/f to 3.5/f, and the sum of the refractive indices for the $d$-line of the lens constituting the first member and of the convergent lens of the second member is greater than 3.295.

3. Objective according to claim 1, characterized in that the axial thickness of the second member is greater than 0.07 f and smaller than 0.134 f.

4. Objective according to claim 1, characterized in that in the third member the refractive index of the convergent lens is greater than 1.63 and the radius of the surface directed towards the fourth member is greater than 0.40 f and smaller than 0.59 f.

5. Objective according to claim 1, characterized in that the quotient of the radii of the surfaces defining the third air lens is smaller than 1.8 and greater than 1.2, the thickness of this lens amounting to between 0.020 f and 0.050 f.

LUDWIG BERTELE.

REFERENCES CITED

The following references are of record in the file of this patent:

UNITED STATES PATENTS

| Number | Name | Date |
|---|---|---|
| 1,077,420 | Minor | Nov. 4, 1913 |
| 2,084,309 | Bertele | June 22, 1937 |
| 2,186,621 | Bertele | Jan. 9, 1940 |

FOREIGN PATENTS

| Number | Country | Date |
|---|---|---|
| 618,360 | Great Britain | Feb. 21, 1949 |